US008238333B2

(12) United States Patent
Glickman et al.

(10) Patent No.: US 8,238,333 B2
(45) Date of Patent: Aug. 7, 2012

(54) METHOD FOR TRANSMITTING DATA AND A DEVICE HAVING DATA TRANSMISSION CAPABILITIES

(75) Inventors: Eran Glickman, Reshon Letzion (IL); Erez Parnes, Petah-Tikva (IL); Noam Sheffer, Tel Aviv-Yaffo (IL)

(73) Assignee: Freescale Semiconductor, Inc., Austin, TX (US)

( * ) Notice: Subject to any disclaimer, the term of this patent is extended or adjusted under 35 U.S.C. 154(b) by 813 days.

(21) Appl. No.: 12/302,227

(22) PCT Filed: May 29, 2006

(86) PCT No.: PCT/IB2006/051695
§ 371 (c)(1),
(2), (4) Date: Nov. 24, 2008

(87) PCT Pub. No.: WO2007/138386
PCT Pub. Date: Dec. 6, 2007

(65) Prior Publication Data
US 2009/0274138 A1 Nov. 5, 2009

(30) Foreign Application Priority Data
May 29, 2006 (WO) .................. PCT/IB2006/051694

(51) Int. Cl.
*H04Q 11/00* (2006.01)
(52) U.S. Cl. ........................................ 370/386; 370/412
(58) Field of Classification Search .................. 370/386, 370/412
See application file for complete search history.

(56) References Cited

U.S. PATENT DOCUMENTS

| 3,593,299 | A | 7/1971 | Driscoll et al. |
| 4,545,051 | A * | 10/1985 | Belforte et al. ............... 370/368 |
| 4,805,172 | A | 2/1989 | Barbe et al. |
| 5,812,547 | A | 9/1998 | Benzimra et al. |
| 5,878,044 | A | 3/1999 | Frischknecht et al. |
| 6,347,344 | B1 | 2/2002 | Baker et al. |
| 6,532,239 | B1 | 3/2003 | Shim et al. |
| 6,735,212 | B1 * | 5/2004 | Calamvokis ................. 370/412 |
| 6,754,242 | B1 | 6/2004 | Briddell et al. |
| 6,771,630 | B1 | 8/2004 | Weitz et al. |
| 6,781,985 | B1 | 8/2004 | Feder et al. |

(Continued)

FOREIGN PATENT DOCUMENTS
EP 0836357 B1 9/1997

(Continued)

OTHER PUBLICATIONS

International Search Report for correlating International Application No. PCT/IB2006/051695 dated Jan. 9, 2007.

(Continued)

*Primary Examiner* — Yemane Mesfin
*Assistant Examiner* — Wanda Russell

(57) ABSTRACT

A method for transmitting data, the method includes scanning at least a first memory unit to retrieve data segments associated with multiple TDM channels, in response to a definition of multiple TDM time frames, each TDM time frame includes multiple time slots; sending the retrieved data segments to an array of line shifters; multiplexing data segments provided from the array of line shifters, in response to the definition, such as to provide in a parallel manner multiple data segments to multiple TDM lines; and transmitting a group of time division multiples data frames over a group of TDM lines.

20 Claims, 11 Drawing Sheets

U.S. PATENT DOCUMENTS

| | | |
|---|---|---|
| 6,782,007 B1 | 8/2004 | Redman |
| 6,836,521 B2 | 12/2004 | Ware et al. |
| 6,839,008 B1 | 1/2005 | Sandner |
| 7,139,293 B1 | 11/2006 | Essen |
| 7,570,654 B2 | 8/2009 | Muthukrishnan et al. |
| 7,571,338 B2 | 8/2009 | Osterling et al. |
| 2003/0223409 A1 | 12/2003 | Wiebe |
| 2004/0062278 A1 | 4/2004 | Hadzic et al. |
| 2005/0135356 A1 | 6/2005 | Muthukrishnan et al. |
| 2005/0207436 A1 | 9/2005 | Varma |
| 2005/0286507 A1 | 12/2005 | Osterling et al. |

FOREIGN PATENT DOCUMENTS

| | | |
|---|---|---|
| EP | 0868087 A | 9/1998 |
| EP | 1026593 A1 | 6/1999 |

OTHER PUBLICATIONS

Huber, H.G., "Universal HDLC Controller Keeps High-Speed Data in Sync" components, Siemens Aktiengesellschaft. Munchen DE, Vol, 27, No. 1, Jan. 1992, pp. 22-24, XP000306055, ISSN: 0945-1137.

Notice of Allowance mailed May 4, 2010 for U.S. Appl. No. 12/302,225, 9 pages.

PCT Search Report mailed Jan. 22, 2007 for International Application No. PCT/IB2006/051694, 3 pages.

* cited by examiner

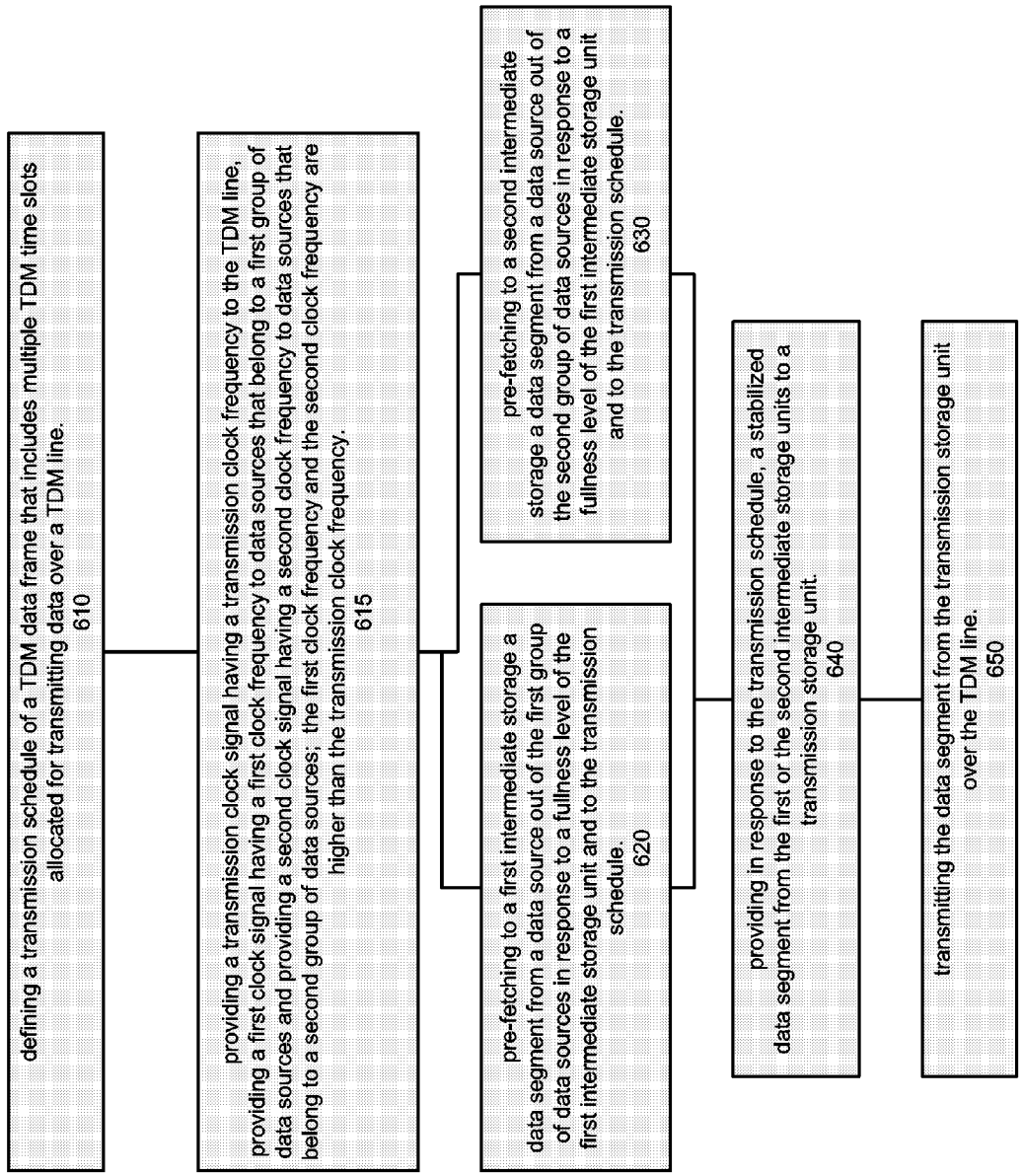

METHOD FOR TRANSMITTING DATA AND A DEVICE HAVING DATA TRANSMISSION CAPABILITIES

FIELD OF THE INVENTION

The invention relates to devices and methods for transmitting data, especially over Time Division Multiplex (TDM) lines.

BACKGROUND OF THE INVENTION

In today's telecommunications, digital networks transport large amounts of information. Network services can be, for example, traditional voice phone, facsimile, television, audio and video broadcast, and information transfer.

With the increasing need of information exchange in the global society, the capacity of existing and future networks must be used efficiently. Multiplexers switch different network services to a single network in such a way that every service is fully maintained and does not disturb other services.

In the near future communication controllers and their components will have to be cheaper but also will have to cope with a dramatic increment in the number of supported data sources, higher communication rates and to efficiently adapt to dynamic communication scenarios.

There is a growing need to support more communication channels and to perform the multiplexing operation in an efficient manner, without complex and area-consuming components.

Yet there is a growing need to design communication controllers and communication controller components (including serial interfaces) in a modular manner, which will facilitate a re-use of many portions of designed components.

SUMMARY OF THE PRESENT INVENTION

A device having transmission capabilities and method for transmitting data, as described in the accompanying claims.

BRIEF DESCRIPTION OF THE DRAWINGS

The present invention will be understood and appreciated more fully from the following detailed description taken in conjunction with the drawings in which:

FIG. 11 illustrates a flow chart of a method according to an embodiment of the invention.

DETAILED DESCRIPTION OF THE DRAWINGS

Embodiments of the present invention illustrated in the accompanying drawings provide methods and devices that transmit sequences of data segments and perform data retrieval on a TDM frame basis or on a TDM frame portion basis.

Data segments associated with multiple TDM channels are retrieved and provided to an array of data buffers and line shifters. The line shifters are connected to multiplexers that select which data to send as an output to a certain TDM line. Conveniently, counters are used for retrieving data segments, providing the data segments to the line buffers and scanning selected inputs of the multiplexers.

Conveniently, the TDM frame basis data retrieval and data processing ease the timing constraints imposed on a TDM channel based data retrieval. Conveniently, the same clock signal is provided to various data retrieval, line shifters and data buffers thus simplifying the synchronization between the various components.

Conveniently, the number of supported TDM channels can dramatically change without altering the structure of the device and especially of a multi-channel communication controller that controls the data retrieval and data processing.

It is noted that the term data includes text, graphics, video, audio, or any other information represented in a computer readable format.

Figure 1:
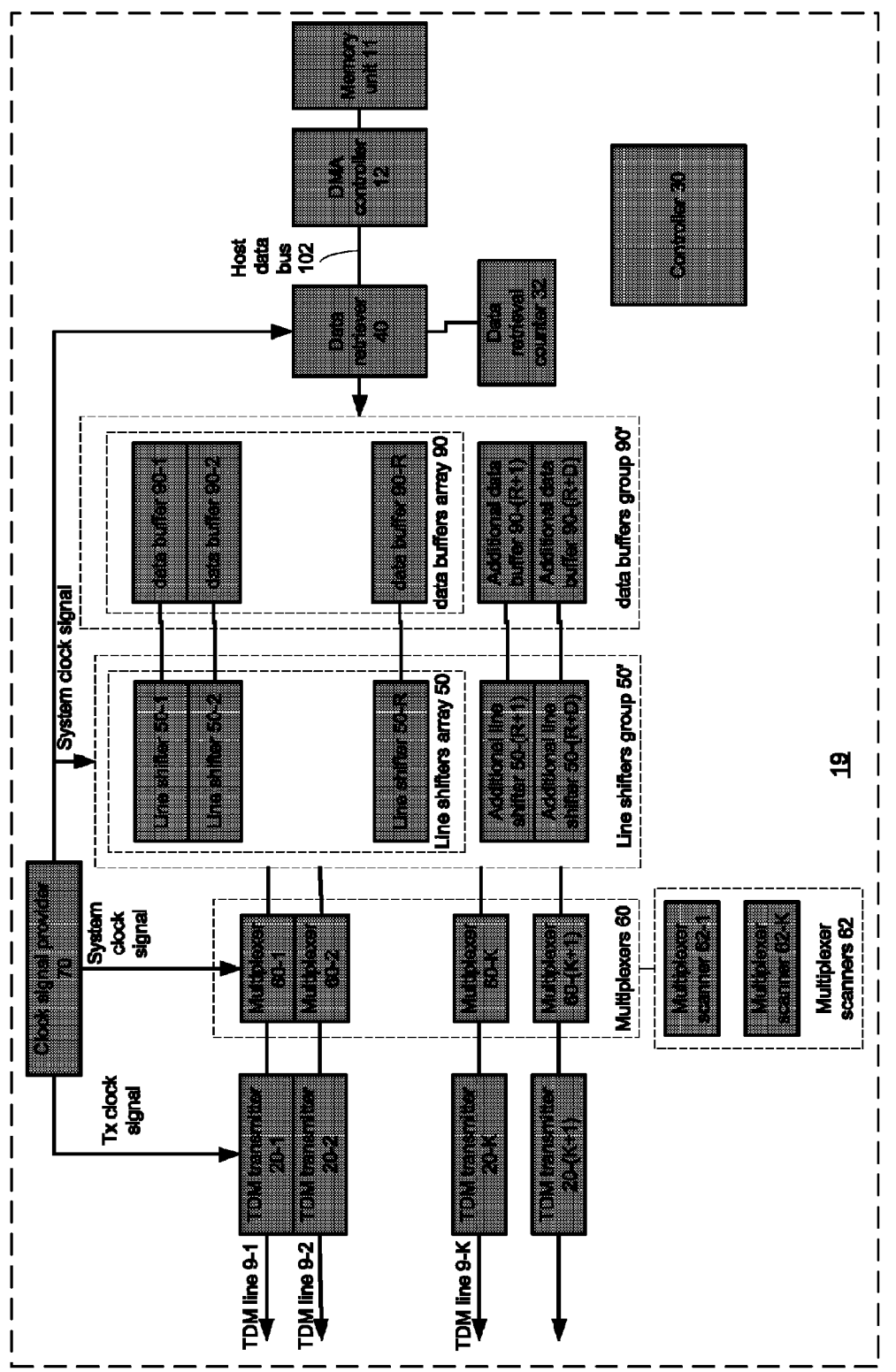
FIG. 1 illustrates a multi-channel communication controller according to an embodiment of the invention.

FIG. 1 illustrates a communication controller 19 according to an embodiment of the invention.

Communication controller 19 is included in device 10. Device 10 can include one or more integrated circuits.

Communication controller 19 includes: (i) Multiple time division multiplex (TDM) transmitters (collectively denoted 20) adapted to transmit a group of data frames over a group of TDM lines 9-1-9-K (collectively denoted 9). (ii) Controller 30, adapted to define or receive a definition of multiple TDM time frames, whereas each TDM time frame includes multiple time slots. (iii) A group 50' of line shifters. (iv) Data retriever 40, adapted to scan at least a first memory unit (such as memory unit 11 connected to DMA controller 12) to retrieve data segments associated with multiple TDM channels, in response to the defined TDM time frames and to send the retrieved data segments to an array 50 of line shifters. A data segment is an amount of data that can be set during the smallest TDM time slot. It defines the granularity of the TDM frame. The group 50' of line shifters can include the array 50 of line shifters and optionally additional line shifters. Array 50 includes active lines shifters—line shifters that participate in a current transmission session. The additional line shifters (also referred to as additional line shifters) can be activated during other communication sessions. For example, referring to FIG. 1 the array 50 of line shifters include line shifters 50-1 till 50-R while the additional line shifters include additional line shifter 50-(R+1) till 50-(R+D). All line shifters (including the additional line shifters) are included within group 50'. (v) Multiple multiplexers 60 adapted to multiplex data segments provided from the array of line shifters, in response to the definition, such as to provide in a parallel manner multiple data segments to multiple TDM transmitters 20. The multiple multiplexers include multiple active multiplexers (such as multiplexers 60-1 till 60-K) and optionally additional multiplexers such as multiplexer 60-(K+1). (vi) Multiple data buffers collectively denoted 90. For example, referring to FIG. 1 there are R active data buffers (data buffers 90-1 till 90-R) and D additional data buffers—90-(R+1) till 90-(R+D). (vii) At least one clock signal provider 70 that is adapted to provide a first clock signal (system clock signal) to the array 50 of line shifters and to the multiple multiplexers 60 and to provide at least one other clock signal (TC clock signal) to the multiple TDM transmitters 20. (viii) Multiple multiplexer scanners 62 adapted to scan selected inputs of the multiple multiplexers 60, and (ix) data retrieval counter 32 that is synchronized to the multiple multiplexer scanners 62.

It is noted that in some cases all the line shifters, the data buffers and/or multiplexers are activated.

Conveniently, communication controller 19 is adapted to receive or define a number of TDM lines that form the group of TDM lines. The TDM lines participate in the current transmission session and can also be referred to as active TDM lines. This definition can be provided by a user, can be associated with a certain task or application executed by device 10 and the like.

Conveniently, communication controller 19 is adapted to define a number of line shifters that form the array 50 of line shifters in response to the number of TDM lines. Conveniently, the group 50' of line shifters includes G line shifters and there are K active TDM lines. Accordingly, the array 50 of line shifters will include R=n*K line shifters, wherein n is a positive integer, n*K is not bigger than G while (n+1)*K is bigger than G.

It is noted that each line shifter (generally referred to as 50-$r$) is preceded by a data buffer (generally referred to as 90-$r$). The inventors used data buffers that were able to store two data segments at once. Two data segments can be transmitted during two TDM time slots.

Conveniently, data retriever 40 is adapted to scan the at least first memory unit at a scanning interval that is responsive to the number of TDM lines. The scanning interval is usually equal to the number of active TDM lines multiplied by a positive integer. Thus, if there are seven active TDM lines and there are thirty-two available line shifters then only twenty eight line shifters are active and the scanning interval can be twenty eight. When using two data segment long line shifters the scanning interval was actually fifty-six (twenty eight multiplied by two).

Device 10 can also alter a definition of the multiple TDM time frames, active TDM lines and the like.

Figure 2:
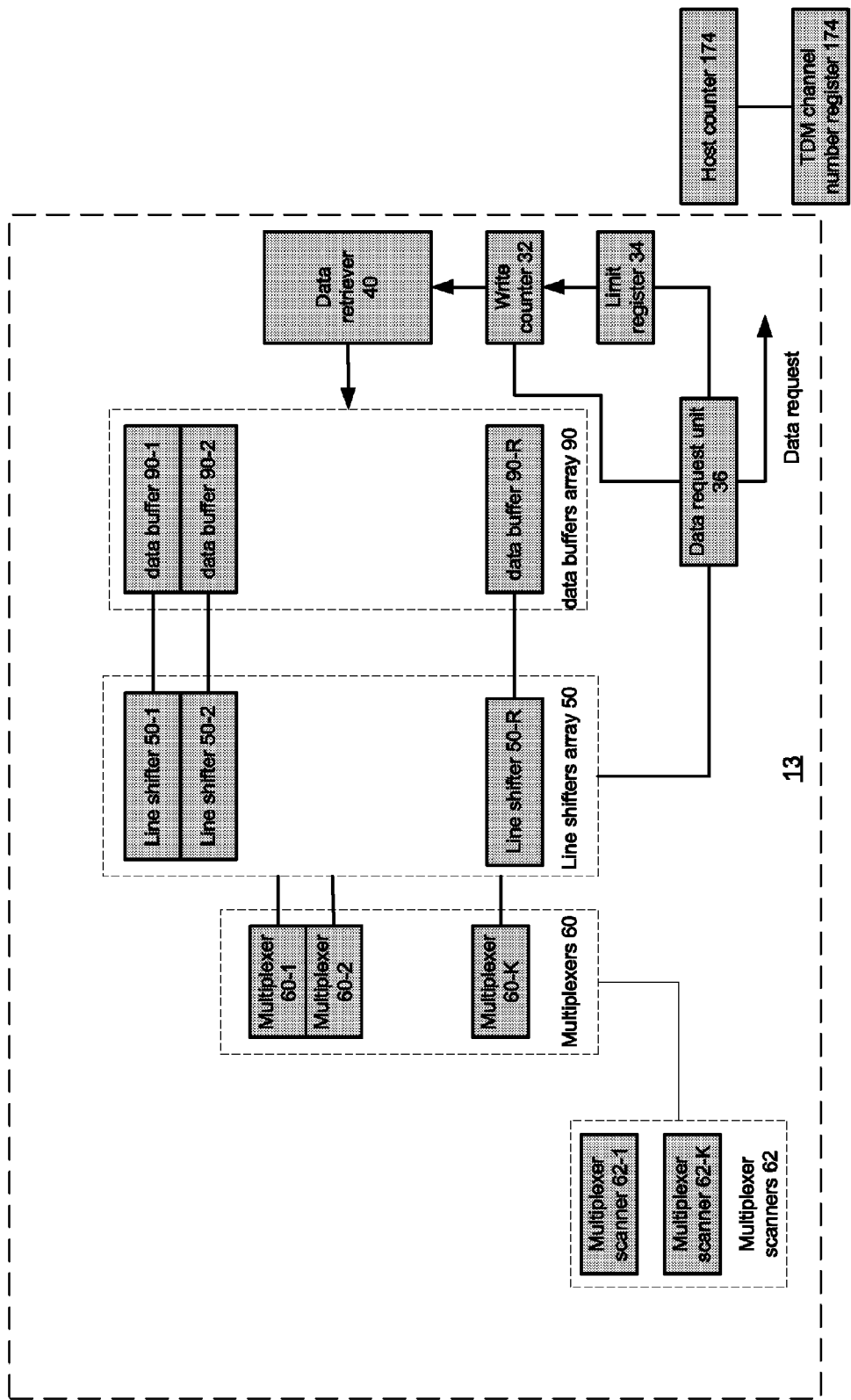
FIG. 2 illustrates a portion of a device according to an embodiment of the invention.

FIG. 2 illustrates portion 13 of device 10, according to an embodiment of the invention.

Portion 13 includes array 50 of line shifters 50-1-50-R, array of data buffers 90-1-90-R, data interface 182, multiple multiplexers 60, multiple multiplexer scanners 62, and controller 30 that includes a limit register 34, a write counter 32 and a data request unit 36. In addition a host TDM channel number register 172 and a host counter 174.

The host TDM channel number register 172 stores the number (Q) of the TDM channels that are expected to provide TDM channel data during a transmission session.

This number (Q) is provided to the channel counter 174 that sequentially scans the Q different channels during each scanning interval. Once Q TDM channels were scanned the sequence restarts. The scanning depends upon the TDM frames that should be transmitted over the K TDM lines.

The data request coming out of data request unit 36 is dependent on the structure of the TDM frame. Channel counter 174 is used to indicate the channel number required but the counter itself is dependent on the TDM frame.

The channel counter 174 is synchronized with various counters such as multiplexer scanners 62 and data retrieval counter 32. Thus, while the channel counter 174 repetitively scans a memory unit (such as memory unit 11) that may store TDM channel data, the write counter 32 and the data interface 182 scan the array of data buffers 90-1, and the multiplexer scanners 62 scan selected inputs of multiplexers 60.

The scanning interval of each of these scanners differ from each other—the scanning interval of multiplexer scanner 62-$k$ is n (as n line shifters are allocated per one TDM line), the scanning interval of the data retrieval counter 32 is R*j (as there are R active data buffers, and each data buffer can receive j data segments) while the scanning interval of channel counter 174 is Q.

Limit register 34 stores a number S that equals R*j (S=R*J). Write counter 32 is adapted to repetitively count from one to S, such as to send data segments provided from host bus 102 to data interface 182 to different data buffers out of data buffers 90-1 till 90-R. If each data buffer can store two data segments then the first two data segments are sent to data buffer 90-1, the next two data segments are sent to data buffer 90-2 until the $(2R-1)^{th}$ and the $2R^{th}$ data segments are sent to data buffer 90-R.

It is assumed that host bus 102 is data segment wide and that the data buffers are two data segment wide. Assuming that a data segment includes V bits then the data buffers and the line shifters are 2*V bit long. The host bus 102 is V+n bits wide, n being control bits, as well as the buses between data retriever 40 to each data buffer, the bus between each data buffer and each line shifter. The line shifters convert the received data segment to a serial stream of data.

It is noted that when the number of active TDM line changes (K changes) the number of active data buffers and number of active line shifters (the size of the array of line shifters and the array of the data buffers) can be changed accordingly.

For example, the inventors used a group of thirty-two line shifters. If K equaled one, two, four, eight, sixteen or thirty-two than all the thirty-two data buffers and the thirty-two line shifters are active. If K equals three, five or six then only thirty data buffers and thirty line shifters are active. If K equals seven only twenty-eight buffers and twenty-eight line shifters are active.

Data request unit 36 can compare between the value stored within counter 32 and limit register 34 and can also receive empty indications from the active line shifters. According to a difference (if exists) between the value stored in write counter 32 and the value (R) stored in limit register 34 and these empty indications the data request unit 36 can send a request to receive new data. The request can be sent to the host.

Figure 3:
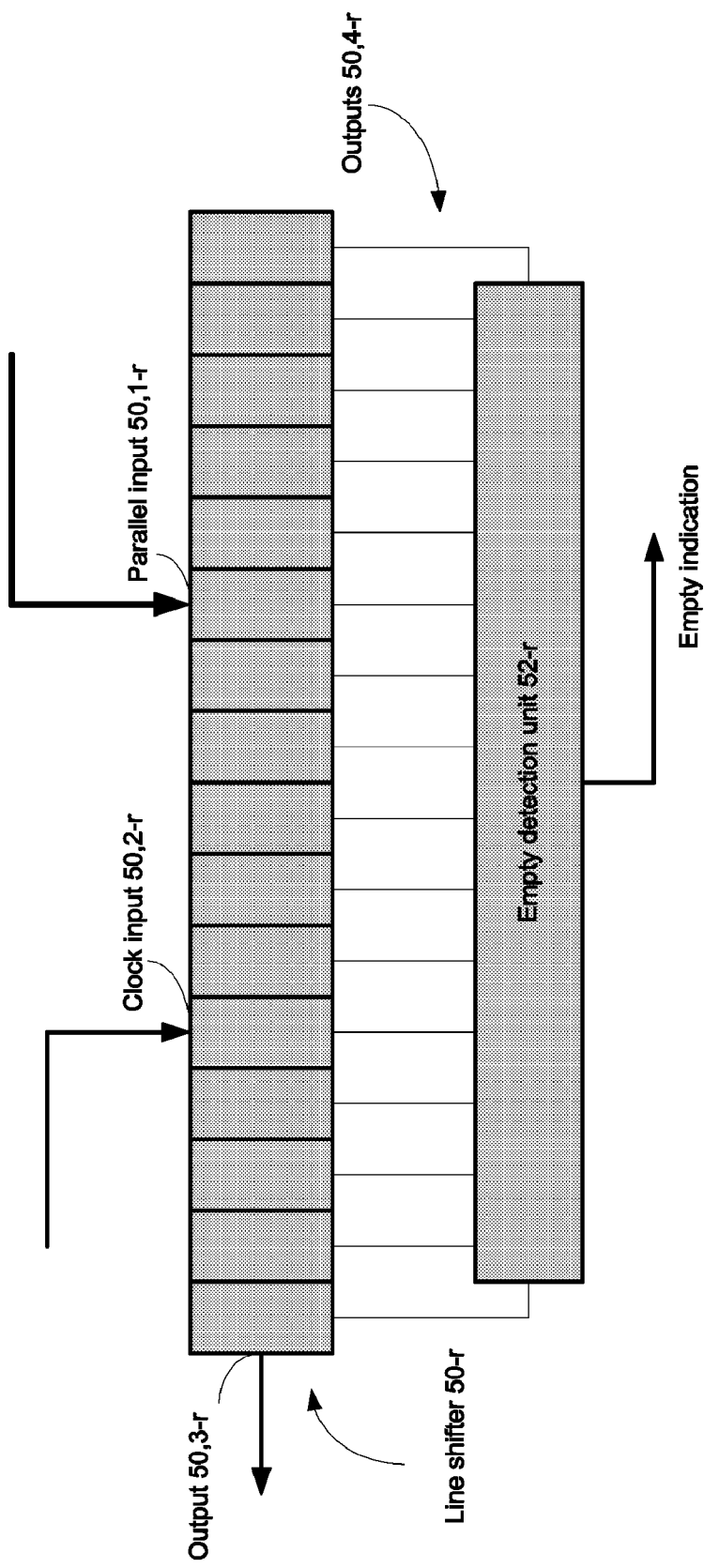
FIG. 3 illustrates a line shifter and an empty detection unit according to an embodiment of the invention.

FIG. 3 illustrates a line shifter 50-$r$ and an empty detection unit 52-$r$ according to an embodiment of the invention.

Index r ranges between 1 and R.

Line shifter 50-$r$ can receive (via parallel input 50,1-$r$) in parallel V bits from corresponding data buffer 90-$r$. It then outputs these bits in a serial manner (via serial output 50,3-$r$) to a multiplexer 60-$r$ once it is selected to provide said data to multiplexer 60-$r$.

The empty detection unit 52-$r$ can be implemented in various manners known in the art. For example, it can include a counter that can indicate that line shifter 50-$r$ is empty V cycles after it started to output data. It can also include a flag based mechanism. Such a flag based mechanism is illustrated in U.S. Pat. No. 6,771,630 of Weits el al. A flag based mechanism is based upon an insertion of a predefined sequence of bits during the serial output of data bits from the line shifter.

For example, assuming that the line shifter has (V+1) bits, the data segment is V bits long, and the line shifter is emptied from right to left. Data is written to the second till $(V+1)^{Th}$ bits of line shifter and "1" is written (via serial input 50,5-$r$) to the first bit (Least Significant Bit) of line shifter 50-r. During each of the next V clock cycles the data is shifted to the left and a sequence of "0" bits is fed to the LSB. Thus, after V clock cycles line shifter 50-r will stores a string that will include "1" followed by V "0" bits. Once this sequence is detected (for example by monitoring the content of line shifter 50-r via parallel output 50,4-r) empty detection unit 52-r indicates that line shifter 50-r is empty. Those of skill in the art will appreciate that other bits can be inserted. For example, the detected sequence can include a single "0" bit followed by V "1" bits. Yet for another example the flag can include multiple bits.

A clock signal is fed via input 50,2-r of line shifter 50-r. The same clock signal can be fed to various components of device 10. Conveniently, this clock signal (also referred to as system clock signal) differs from the clock signal provided to the TDM line (also referred to as Tx clock signal).

Figure 4:
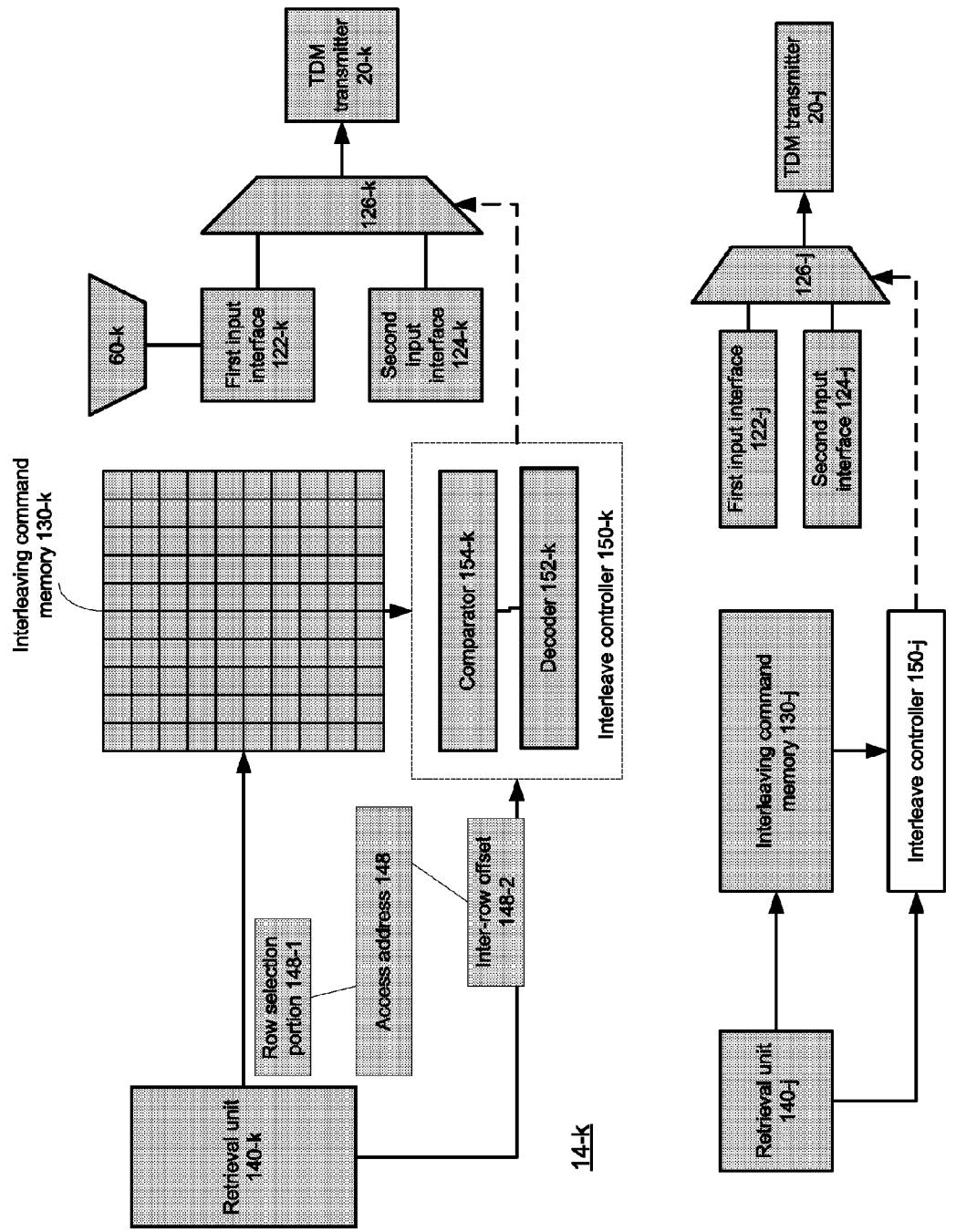
FIG. 4 illustrates a data interleaver and its environment according to another embodiment of the invention.

FIG. 4 illustrates data interleaver 14-k and its environment according to another embodiment of the invention.

Data interleaver 14-k and its environment are part of device 10. Data interleaver 14-k performs data interleaving operations.

Data interleaver 14-k is connected to TDM transmitter 20-k, and includes first input interface 122-k, second input interface 124-k, interleaving multiplexer 126-k, interleaving command memory unit 130-k, retrieval unit 140-k and a interleaving controller 150-k.

Retrieval unit 140-k, interleaving command memory unit 130-k and interleave controller 150-k are connected to each other. Interleave controller 150-k is further connected to a control input of interleaving multiplexer 126-k. Two inputs of the interleaving multiplexer 126-k are connected to the first and second input interfaces 122-k and 124-k.

The first input interface 122-k can receive data from a data source such as but not limited to multiplexer 60-k. The second input interface 124-k can receive data from another data source. Conveniently, the interleaving multiplexer 126-k can be connected between multiplexer 60-k and TDM transmitter 20-k. It is noted that this is not necessarily so and interleaving multiplexer 126-k can be connected to an input of serial interface 16 of FIG. 6.

Interleaving multiplexer 126-k, interleaving controller 150-k, retrieval unit 140-k facilitates a selection of data from the first or second input interfaces 124-k and 126-k.

It is noted that TDM line 9-k can be associated with a circuit that includes interleaving multiplexer 126-k, interleaving controller 150-k and retrieval unit 140-k, but this is not necessarily so. The interleaving command memory unit 130-k can store interleaving commands relating to multiple selections between multiple data sources and interleaving multiplexer 126-k can be replaced by a multiplexing circuit that has multiple outputs as well as multiple inputs.

Interleaving command memory unit 130-k is adapted to store a two dimensional array of interleaving command information that includes multiple interleaving command information rows. Each row includes interleaving commands associated with multiple TDM time slots.

The inventors used a 32*32 bit interleaving command memory unit 130-k that includes 32 rows, of 32-bit each, whereas each bit indicated whether to select a data received at first input interface 122-k or at second input interface 124-k. It is noted that multiple bits can be allocated per TDM channel and that the two dimensional array can be used to control multiple multiplexing decisions simultaneously, especially if multiple bits are allocated per multiple multiplexing decisions.

Retrieval unit 140-k is adapted to retrieve interleaving command information rows from the interleaving command memory unit 130-k. It is adapted to receive or generate an access address 148 that indicates the number of TDM channel that is the subject of the interleaving decision. Access address 148 includes row selection portion 148-1 and inter-row offset portion 148-2. Row selection portion 148-1 is sent to interleaving command memory unit 130-k and used to retrieve an interleaving command row while inter-row offset portion 148-2 is used to select a bit within the interleaving command row.

According to an embodiment of the invention the interleaving command row includes thirty-two bits. The value and location of bits within the row indicates whether data associated with a certain TDM channel should be provided from the first input interface 122-k or from the second input interface.

For example, if within the first row (value of the row selection portion is zero) the fifth, tenth and eighteen bits are set then data associated with the fifth tenth and eighteenth TDM channels will be provided from the second input interface 126-k.

Conveniently, the interleaving controller 150-k includes a decoder 152-k and a comparator 154-k that performs a bitwise AND operation. The decoder 152-k decodes the inter-row offset from a (normal) binary format to the format of the interleaving command row.

TABLE 1 illustrates various examples of exemplary interleaving command information rows, inter-row offsets, decoded inter-row offsets and the result of various comparisons between these values.

For simplicity of explanation only the two least significant bytes of these 32-bit long variables are shown. A "match" indicates that two "1" bits were found at the same location in both the interleaving command row and in the decoded inter-row offset.

TABLE 1

| Interleaving command row | Inter-row offset | Decoded inter-row offset | Comparison result |
| --- | --- | --- | --- |
| 0000000001000001 | 0000000000000111 | 0000000001000000 | Match ($7^{th}$ bit) |
| 0000000001000001 | 0000000000000001 | 0000000000000001 | Match ($1^{st}$ bit) |
| 0000000001000001 | 0000000000001000 | 0000000010000000 | No-match |
| 0000000000001111 | 0000000000000100 | 0000000000001000 | Match ($4^{th}$ bit) |
| 0000000000001111 | 0000000000000011 | 0000000000000100 | Match ($3^{rd}$ bit) |
| 0000000000001111 | 0000000000000001 | 0000000000000001 | Match ($1^{st}$ bit) |
| 0000000000001111 | 0000000000010000 | 1000000000000000 | No-match |

The first three interleaving command rows indicate that data associated with the first and seventh TDM channels should be provided from second data interface 124-*k*. The fourth till seventh interleaving command rows indicate that data associated with the first till fourth TDM channels should be provided from second data interface 124-*k*. If a match occurs the data should be provided from second data interface 124.

Comparator 154-*k* conveniently includes multiple AND logic gates (an AND gate is allocated for each bit of the interleaving command row) each providing an intermediate result, wherein are the AND logic gates are connected to a single OR gate such as to provide a match result. When using a thirty-two bit row there are thirty-two AND gates and a single OR gate.

Conveniently, retrieval address 148 used by the retrieval unit 140-*k* represents the TDM channel number that is being transmitted (or going to be transmitted) during a current TDM time slot.

Conveniently, the first and second input interfaces 122-*k* and 124-*k* are adapted to enter a high impedance state when the other input interface is selected. According to another embodiment of the invention device 10 includes additional circuitries that manage the interleaving process of other data sources that can be associated with different TDM lines. If there are K TDM lines there can be up to K different circuitries.

FIG. 4 also illustrates another data interleaver 14-*j* according to an embodiment of the invention.

Data interleaver 14-*j* (index j differs from index k) is connected to another TDM transmitter 20-*j* and includes second interleaving command memory unit 130', second retrieval unit 140' and second interleaving controller 150'. These components are equivalent to TDM transmitter 20-*k*, interleaving command memory unit 130-*k*, retrieval unit 140-*k* and interleaving controller 150-*k*.

Figure 5:
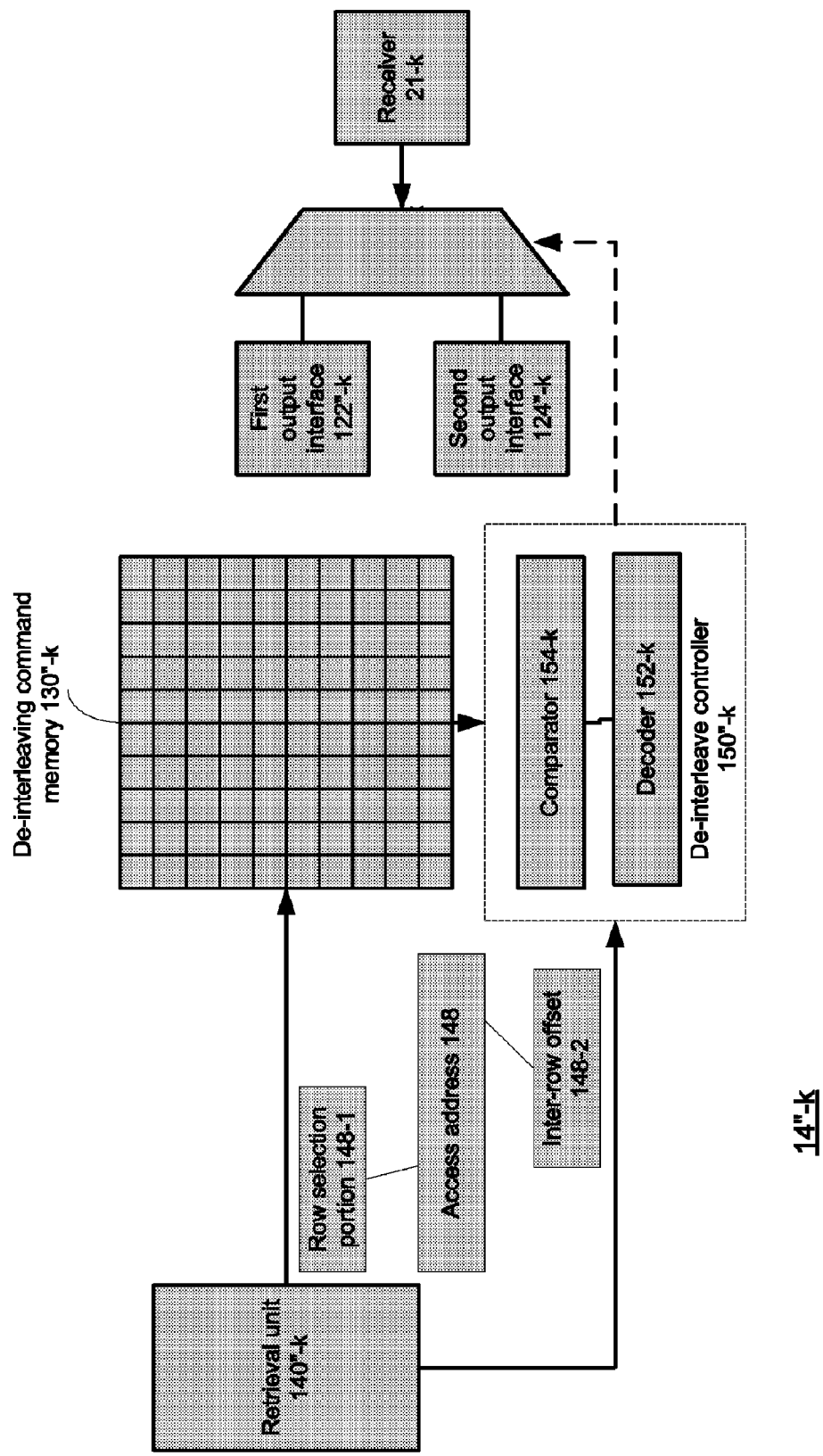
FIG. 5 illustrates a data DE-interleaver and its environment according to an embodiment of the invention.

FIG. 5 illustrates data de-interleaver 14"-*k* according to an embodiment of the invention.

Data de-interleaver 14"-*k* performs de-interleaving while data interleaver 14-*k* performs interleaving.

Device 10 includes data de-interleaver 14"-*k* that includes: receiver 21-*k* that is adapted to receive data. Device 10 further includes: (i) first and second output interfaces 122"-*k* and 124"-*k* that are adapted to provide information to a first data target and to a second data target, (ii) de-interleaving command memory unit 130"-*k* adapted to store a two dimensional array of de-interleaving command information that includes multiple de-interleaving command information rows, each row includes de-interleaving commands associated with multiple TDM time slots; (iii) retrieval unit 140"-*k* adapted to retrieve de-interleaving command information from the de-interleaving command memory unit; and de-interleaving controller 150"-*k* adapted to determine, in response to the retrieved de-interleaving command information, whether to provide data to the first data target or to the second data target. The determination affects de-multiplexer 126"-*k* that selectively provided data to one out of interfaces 124" and 126".

Conveniently, retrieval unit 140"-*k* is adapted to retrieve de-interleaving command information rows from the de-interleaving command memory unit 130".

Conveniently, retrieval unit 140" is adapted to access de-interleaving command memory unit 130" by a retrieval address that comprises a row selection portion and an inter-row offset portion.

Figure 6:
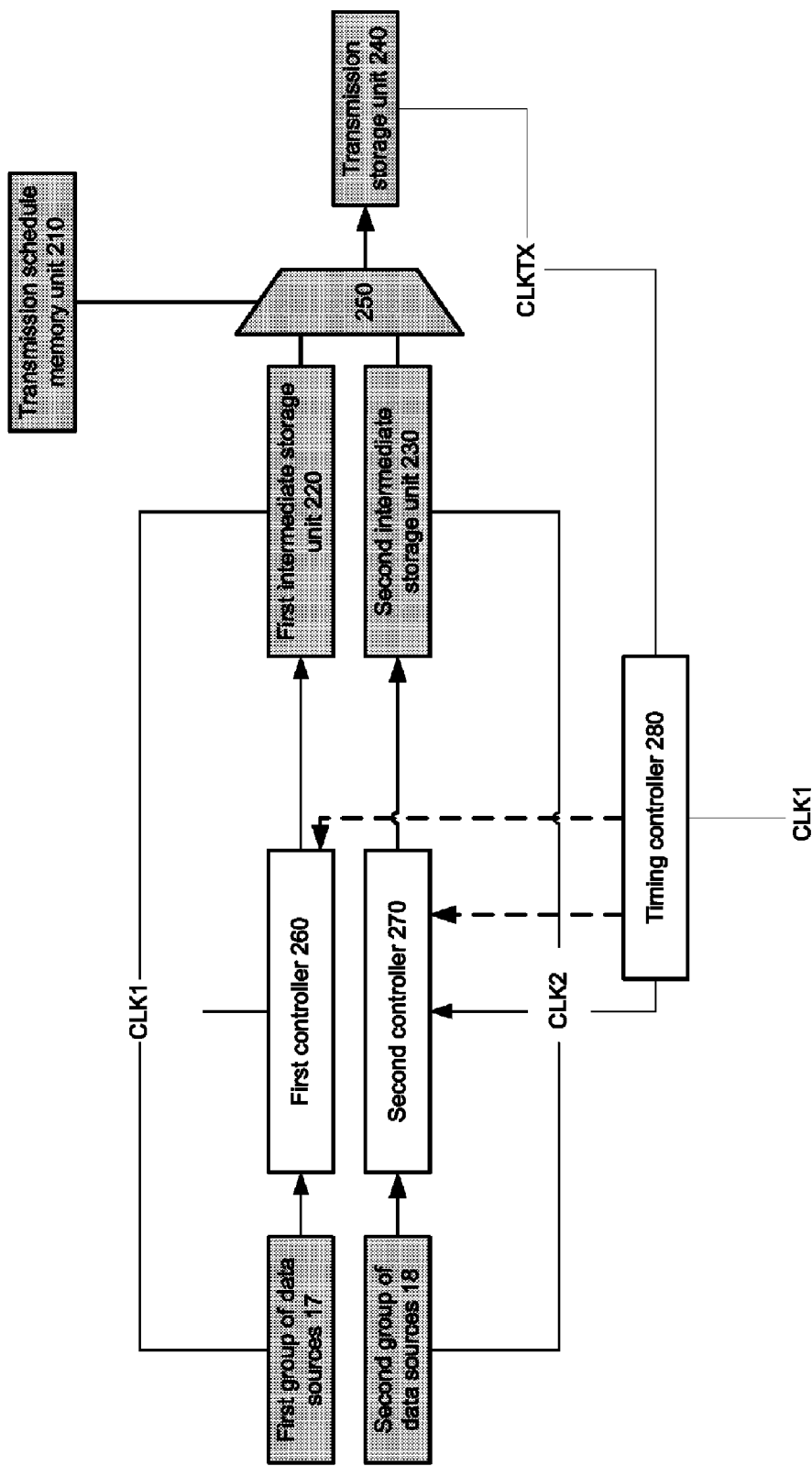
FIG. 6 illustrates a serial interface according to another embodiment of the invention.

FIG. 6 illustrates serial interface 16 according to another embodiment of the invention.

Serial interface 16 is designed in a modular manner and can be easily adapted to serve additional data sources by either allowing an existing controller to control the transmission from another data source or by adding a new controller that can manage data sources that belong to new clock domains.

These data sources can include a data interleaver such as data interleavers 14-*k*, 14-*j*, communication controller 13 and the like.

Serial interface 16 can output data via multiple outputs to multiple lines. It can multiplex data of various types over one or more outputs and the like.

Serial interface 16 includes transmission schedule memory unit 210, first intermediate storage unit 220, second intermediate storage unit 230, transmission storage unit 240, multiplexer 250 and controllers 260-280.

The output of serial interface 16 is the output of transmission storage unit 240. It can be connected to a physical layer unit 881 that in turn is connected to first communication channel 901 of FIG. 7. As serial interface 16 aggregates data from many communication controllers over one or more lines the latter line can be referred to as a TDM line, although this line actually aggregates data aimed to multiple TDM lines.

An output of multiplexer 250 is to the input of transmission storage unit 240, while two inputs of multiplexer 250 are connected to first and second intermediate storage units 220 and 230 respectively. Transmission storage unit 240 is clocked by a transmission clock signal CLKTX that has a transmission frequency Ftx.

Multiplexer 250 is controlled by timing controller 280 that determines which intermediate storage unit will provide data via multiplexer 250 to transmission storage unit 240.

First controller 260 is connected between a first group of data sources (collectively denoted 17) to first intermediate storage unit 220. These data sources share the same clock signal—first clock signal CLK1 that has a first frequency F1.

Second controller 270 is connected between a second group of data sources (collectively denoted 18) to second intermediate storage unit 230. These data sources share the same clock signal—second clock signal CLK2 that has a second frequency F2.

F1 and F2 are higher than Ftx. Conveniently, F1 and F2 are higher than at least 2*Ftx. The inventors used a 4:1 ratio between F1 and F2 and between Ftx. This clock frequency difference allows device 10 to pre-fetch data to an intermediate data storage unit after it is emptied and to stabilized this pre-fetched data before the next transmission cycle. Communication controller 19 can be connected to first physical layer unit 881.

Conveniently, the first clock frequency differs from the second clock frequency. Conveniently, the stabilization period is responsive to hold and setup times of the intermediate storage units.

The frequency mismatch guarantees that the transmission section (including at least transmission storage unit 240) can sample data from the intermediate storage units without performing tedious synchronization efforts.

Controller 280 receives CLK1, CLK2 and CLKTX and times the sampling operations as well as the pre-fetch operations. As indicated above a controller (such as controllers 260 and 270) is allocated per time domain. Accordingly, multiple data sources can be added or removed without substantially altering the design of portion 16.

Conveniently, storage units 220, 230 and 240 are one-bit long, thus eliminating the need to provide complex pipeline control mechanisms.

The provision of data to transmission storage unit 240 as well as the pre-fetching of data to the first and second intermediate storage units 220 and 230 is responsive to information representative of a transmission schedule of a TDM data frame stored within transmission schedule memory unit 210.

Conveniently, controllers 260-280 cooperate in order to perform the following tasks: (i) control a pre-fetch of a data segment to first intermediate storage unit 220 from a data source out of a first group of data sources in response to a fullness level of first intermediate storage unit 220 and in response to the transmission schedule; (ii) control a pre-fetch of a data segment to second intermediate storage unit 230 from a data source out of a second group of data sources in response to a fullness level of second intermediate storage unit 230 and in response to the transmission schedule, and (iii) control a provision of a stabilized data segment from the first or the second intermediate storage units 220 and 230 to the transmission storage unit 240, in response to the transmission schedule.

The following example illustrates some pre-fetch and data provisions. It is assumed that F1 equals F2 and that F1=4*Ftx. It is also assumed that there is a one first clock cycle difference between CK1 and CLKTX.

It is assumed that the transmission schedule includes the following sequence: two bits from data source 17-1, three bits from data source 18-4, a bit from data source 18-1 and two bits from data source 17-2. Data sources 17-1 and 17-2 belong to first group of data sources 17. Data sources 18-1 and 18-4 belong to second group of data sources 18.

TABLE 2 illustrates a sequence of pre-fetch operations and provision of data to transmission storage unit 240.

TABLE 2

| Clock cycle | Operation |
| --- | --- |
| First clock cycle of CK1 and CK2 | Pre-fetching a first data bit from data source 17-1 to first intermediate storage unit 220 and pre-fetching a first data bit from data source 18-4 to second intermediate storage unit 230 |
| Second clock cycle of CLK1 (during first clock cycle of CLKTX) | Providing the first data bit from 17-1 to transmission storage unit 240. |
| Third clock cycle of CK1 | Pre-fetching a second data bit from data source 17-1 to first intermediate storage unit 220 |
| Fifth clock cycle of CLK1 (during second clock cycle of CLKTX) | Providing the second data bit from 17-1 to transmission storage unit 240. |
| Sixth clock cycle of CLK1 | Pre-fetching a first data bit from data source 17-2 to first intermediate storage unit 220 |
| Eighth clock cycle of CLK2 (during third clock cycle of CLKTX) | Providing the first data bit from 18-4 to transmission storage unit 240. |
| Tenth clock cycle of CLK2 | Pre-fetching a second data bit from data source 18-4 to second intermediate storage unit 230 |
| Thirteenth clock cycle of CLK2 (during fourth clock cycle of CLKTX) | Providing the second data bit from 18-4 to transmission storage unit 240. |
| Fourteenth clock cycle of CLK2 | Pre-fetching a third data bit from data source 18-4 to second intermediate storage unit 230 |
| Seventeenth clock cycle of CLK2 (during fifth clock cycle of CLKTX) | Providing the third data bit from 18-4 to transmission storage unit 240. |

TABLE 2-continued

| Clock cycle | Operation |
| --- | --- |
| Eighteenth clock cycle of CLK2 | Pre-fetching a first data bit from data source 18-1 to second intermediate storage unit 230 |
| Twenty first clock cycle of CLK2 (during sixth clock cycle of CLKTX) | Providing the first data bit from 18-1 to transmission storage unit 240. |
| Twenty second clock cycle of CK2 | Pre-fetching a new data bit from data source 18-4 to second intermediate storage unit 230 (for the next iteration of the transmission sequence) |
| Twenty fifth clock cycle of CLK1 (during seventh clock cycle of CLKTX) | Providing the first data bit from 17-2 to transmission storage unit 240. |
| Twenty sixth clock cycle of CLK1 | Pre-fetching a second data bit from data source 17-2 to first intermediate storage unit 220 |
| Twenty ninth clock cycle of CLK1 (during eighth clock cycle of CLKTX) | Providing the second data bit from 17-2 to transmission storage unit 240. |
| Twenty sixth clock cycle of CLK1 | Pre-fetching a new data bit from data source 17-4 to first intermediate storage unit 220 (for the next iteration of the transmission sequence) |

Figure 7:
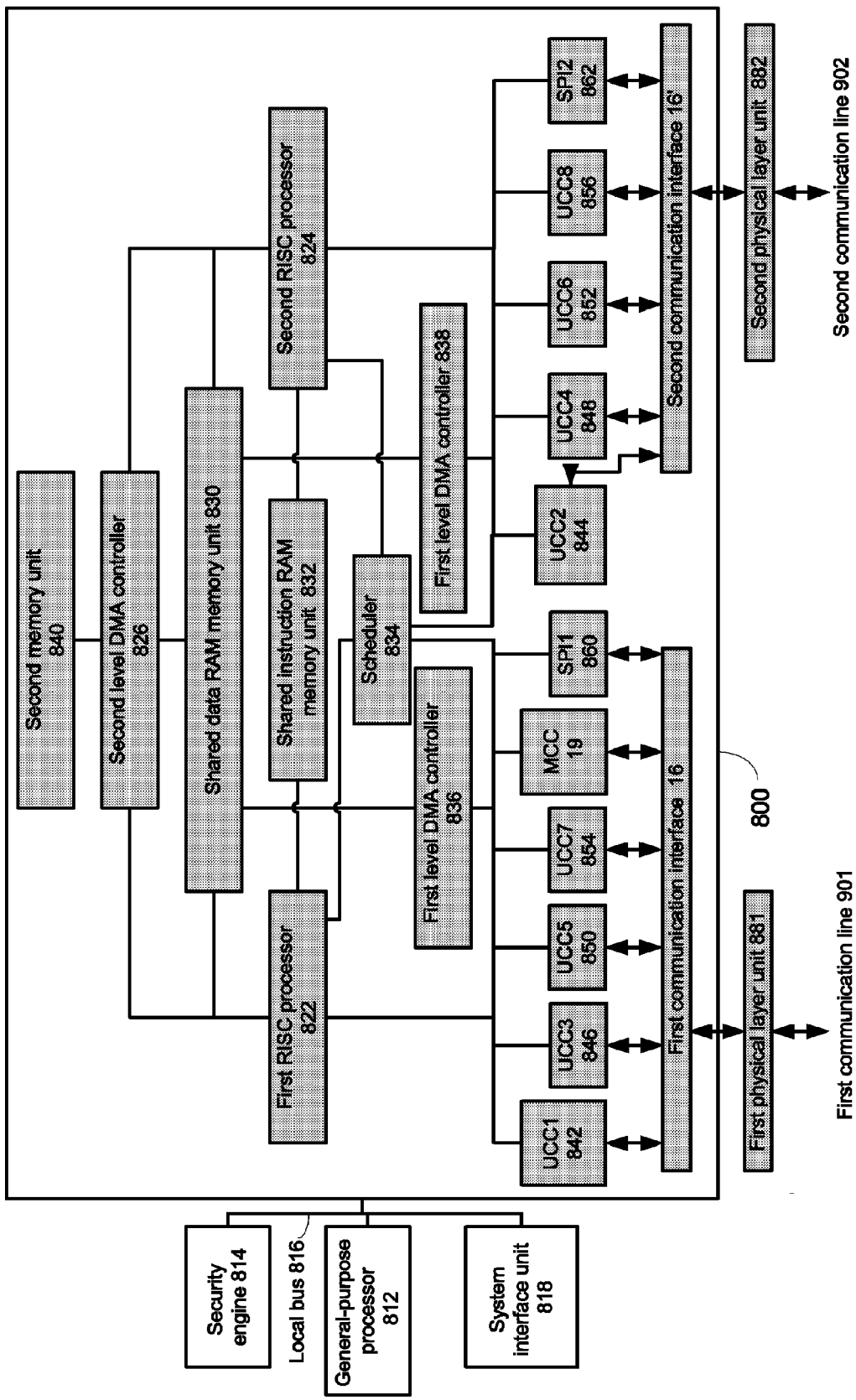
FIG. 7 illustrates a device according to an embodiment of the invention.

FIG. 7 illustrates device 10 according to an embodiment of the invention.

Device 10 includes a general-purpose processor 812, a security engine 814, system interface unit 818, communication engine 800 and multiple ports (not shown). Components 812, 814, 818 and 800 are connected to each other by local bus 816.

The general-purpose processor 812 can include multiple execution units such as but not limited to an integer unit, a branch-processing unit, a floating-point unit, a load/store unit and a system register unit. It can also include various cache memories, dynamic power management unit, translation look aside buffers, and the like.

The general-purpose processor 812 controls device 10 and can execute various programs according to the required functionality of device 10. The general-purpose processor 812 can be a member of the PowerPC™ family but this is not necessarily so.

The security engine 814 can apply various security mechanisms including encryption based mechanisms and the like.

Device 10 can be connected to multiple memory units as well as other components. System interface unit 818 interfaces these components. System interface unit 818 may include some of the following components: external memory controllers, external DDR interface unit, PCI bridge, local bus, bus arbitrator, dual UART unit, dual I²C unit, a four channel DMA controller, an interrupt controller, and the like. It is noted that other interfacing components can be used.

Communication engine 800 is a versatile communication component that can manage multiple communication ports that operate according to different communication protocols.

According to an embodiment of the invention multiple hardware Buffers share the same first memory unit. This first memory unit usually stores at least one virtual Buffer per hardware Buffer.

Communication engine 800 includes multiple communication controllers of different types. Each communication controller can manage one or more communication channels.

Conveniently, each communication channel is associated with a single virtual buffer. A bi-directional communication channel is viewed as a combination of a receive communication channel and a transmit communication channel. Each such communication channel can have its own information transfer controller, virtual buffers, hardware Buffer, and the like.

It is noted that one or more communication channels can be controlled by a single information transfer controller, but this is not necessarily so.

The communication engine 800 includes two RISC processors 822 and 824, second level DMA controller 826, a shared data RAM memory unit 830, a shared instruction RAM memory unit 832, scheduler 834, two first level DMA controllers 836 and 836, a second memory unit 840, eight universal communication controllers denoted UCC1-UCC8 842-856, one multi-channel communication controller 19, two serial communication controllers SP1 860 and SP2 862, two serial interfaces 16 and 16'. It is noted that additional components, such as but not limited to various ports, time slots assigners and the like were omitted for simplicity of explanation.

The first RISC processor 822 is connected to UCC1 842, UCC3 846, UCC5 850, UCC7 857, MCC 19 190, SPI1 860, scheduler 834, shared instruction RAM memory unit 832 and shared data RAM memory unit 830. Scheduler 834 can manage the access to first RISC processor 822.

The second RISC processor 824 is connected to UCC2 844, UCC4 848, UCC6 852, UCC8 856, SPI2 862, scheduler 834, shared instruction RAM memory unit 832 and shared data RAM memory unit 830. Scheduler 834 can manage the access to second RISC processor 824.

First level DMA controllers 836 and 838 are connected to the shared data RAM memory unit 830 and to information transfer controllers (not shown) within the various communication controllers.

Each communication controller out of communication controllers UCC1-UCC8 842-856, MCC 19, and SPI1-SPI2 860-862 can include transmission paths as well as reception paths.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC 19 supports two hundred and fifty six HDLC or transparent channels, one hundred and twenty eight SS#7 channels or multiple channels that can be multiplexed to one or more TDM interfaces.

In addition, communication engine 800 can include a controller (not shown) as well as an interrupt unit that coordinate the various components of the communication engine, as well as to enable the communication engine 800 to communicate with general-purpose processor 812, security engine 814 and system interface unit 818.

Conveniently, a group of communication controllers are connected to a single first level DMA controller, but this is not necessarily so. For example, first level DMA controller 836 serves communication controllers UCC1, UCC3, UCC5, UCC7, MCC1 and SPI1, while first level DMA controller 338 serves communication controllers UCC2, UCC4, UCC6, UCC8 and SPI2.

The information frame transmitters can include PHY layer transmitters included within first and second physical layer units 881 and 882, as well as MAC layer transmitters. The MAC layer transmitters form a part of each universal communication controller out of UCC1-UCC8 842-856. The first and second communication interfaces 16 and 16' can also be regarded as part of the information frame transmitters.

Figure 8:
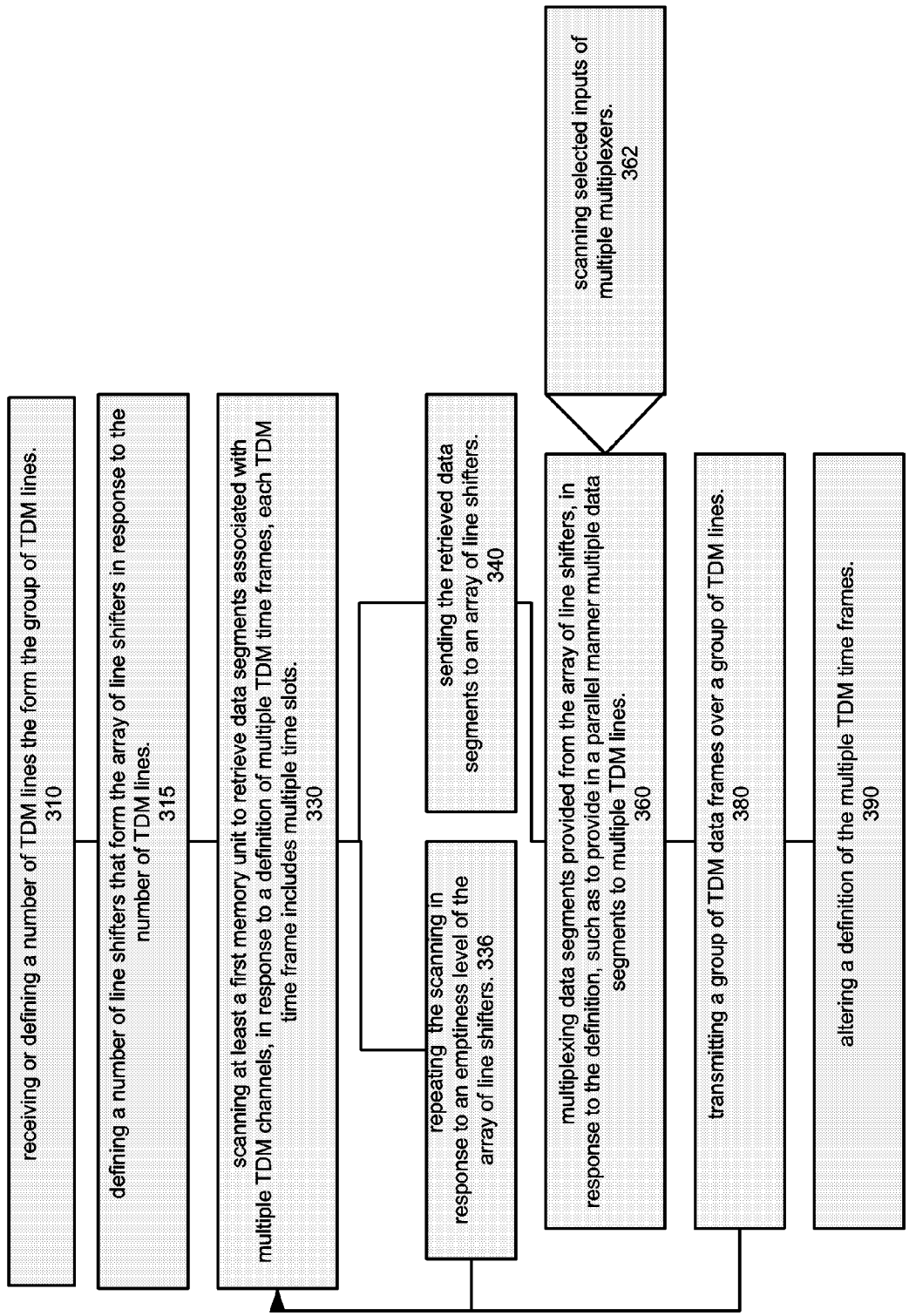
FIG. 8 illustrates a method for transmitting data according to an embodiment of the invention.

FIG. 8 illustrates method 300 for transmitting data, according to an embodiment of the invention.

Method 300 starts by stage 310 of receiving or defining a number of TDM lines the form the group of TDM lines. The group of TDM lines includes active TDM lines-TDM TDM lines that participate in a transmission sequence. It is noted that there can be additional TDM lines that do not participate in the transmission sequence. These TDM lines are also referred to as deactivated TDM lines. It is noted that the number (and optionally the identity) of active TDM lines can be defined by a user. It usually corresponds to the connectivity of a device that executed method 300 and alternatively or additionally to an application or task executed by that device.

It is noted that the number of active TDM lines can be altered from one iteration of method 300 to another and that change in this number also changes various scanning stages of method 300.

Usually, stage 310 includes selecting the TDM lines that participate during a certain transmission session. The selection can include selecting a sub-set of the possible TDM lines or selecting all the TDM lines.

Conveniently, stage 310 is followed by stage 315 of defining a number of line shifters that form the array of line shifters in response to the number of TDM lines. The line shifters that form the array are referred to active line-shifters while line shifters that are not part of that array are also referred to as deactivated line shifters. Typically, all active TDM lines are associated with the same number of line shifters.

For example, assuming that there is a group of G line shifters and there are K active TDM lines than each TDM line will be serviced by n line shifters, and the size of the line shifter array will be R (R equals n*K), wherein R is not bigger than G and while (n+1)*K is bigger than G. In a mathematical form: $n*K \leq G \leq (n+1)*K$.

This allocation simplifies the control scheme of method 300, as there is a simple residual free mapping between active TDM lines and the different data paths that are used to provide data segments to these TDM lines.

Stage 315 is followed by stage 330 of scanning at least a first memory unit to retrieve data segments associated with multiple TDM channels, in response to a definition of multiple TDM time frames, each TDM time frame includes multiple time slots. The scanning is conveniently done using one or more counters. The definition is performed by defining the number of active channels to be spread over the active TDM links.

Conveniently, the scanning includes scanning a scanning interval that is responsive to the number of TDM lines that belong to the group of TDM lines.

Stage 330 is followed by stages 336 and 340. Stage 336 includes repeating the scanning in response to an emptiness level of the array of line shifters. Thus, when line shifters are empty, and especially when all line shifters are empty new data can be retrieved from the first memory unit. Conveniently, the memory unit is scanned by a counter and the repetition includes resetting the counter. The request for new data may also be dependent on the data buffers according the required system clock ratio and quality of service. The request may be connected in such a manner that as soon as there is room in the buffers a request is asserted.

Stage 340 includes sending the retrieved data segments to an array of line shifters. Stage 340 can include sending sequences of retrieved data segments to sequences of line shifters within the array of line shifters. AN optional stage of generating a data request may follow this stage.

Stage 340 is followed by stage 360 of multiplexing data segments provided from the array of line shifters, in response to the definition, such as to provide in a parallel manner multiple data segments to multiple TDM lines. For example, if K TDM lines are active then K data segments can be sent in parallel from different line shifters.

Conveniently, stage 360 includes stage 362 of scanning selected inputs of multiple multiplexers. For example, assuming that: (i) there are K multiplexers that are connected to K active TDM lines, (ii) n line shifters are allocated per TDM line, and (iii) each multiplexer is also connected to the G line shifters. In this case a multiplexer that is connected to a certain TDM line is controlled by sequentially scanning n multiplexer inputs connected to n active line shifters associated with that certain TDM line.

Stage 360 is followed by stage 380 of transmitting a group of TDM data frames over a group of TDM lines. Each TDM line can be viewed as conveying a single TDM frame. Thus, by using multiple (K) TDM lines K TDM frames are sent in parallel to each other.

Stage 380 can be followed by jumping to stage 330 and alternatively or additionally by stage 390 of altering a definition of the multiple TDM time frames. This alteration may include changing the number (and/or the identity) or active TDM lines, changing the time slots allocated for TDM channels and the like.

According to an embodiment of the invention the transmitting can also include interleaving data provided from one or more multiplexers with data provided from other data sources. This interleaving may involve applying at least one of the stages of method 400 of FIG. 9.

According to yet another embodiment of the invention the transmitting can also include sending data segments from data sources of different clock domains to a unit that can then send selected data segments over the TDM line. Accordingly the transmission can involve at least one stage of method 600 of FIG. 10.

An exemplary implementation of method 300 is illustrated in FIG. 1. It is noted that other circuits can implement method 300 without departing from the spirit of the invention.

Figure 9:
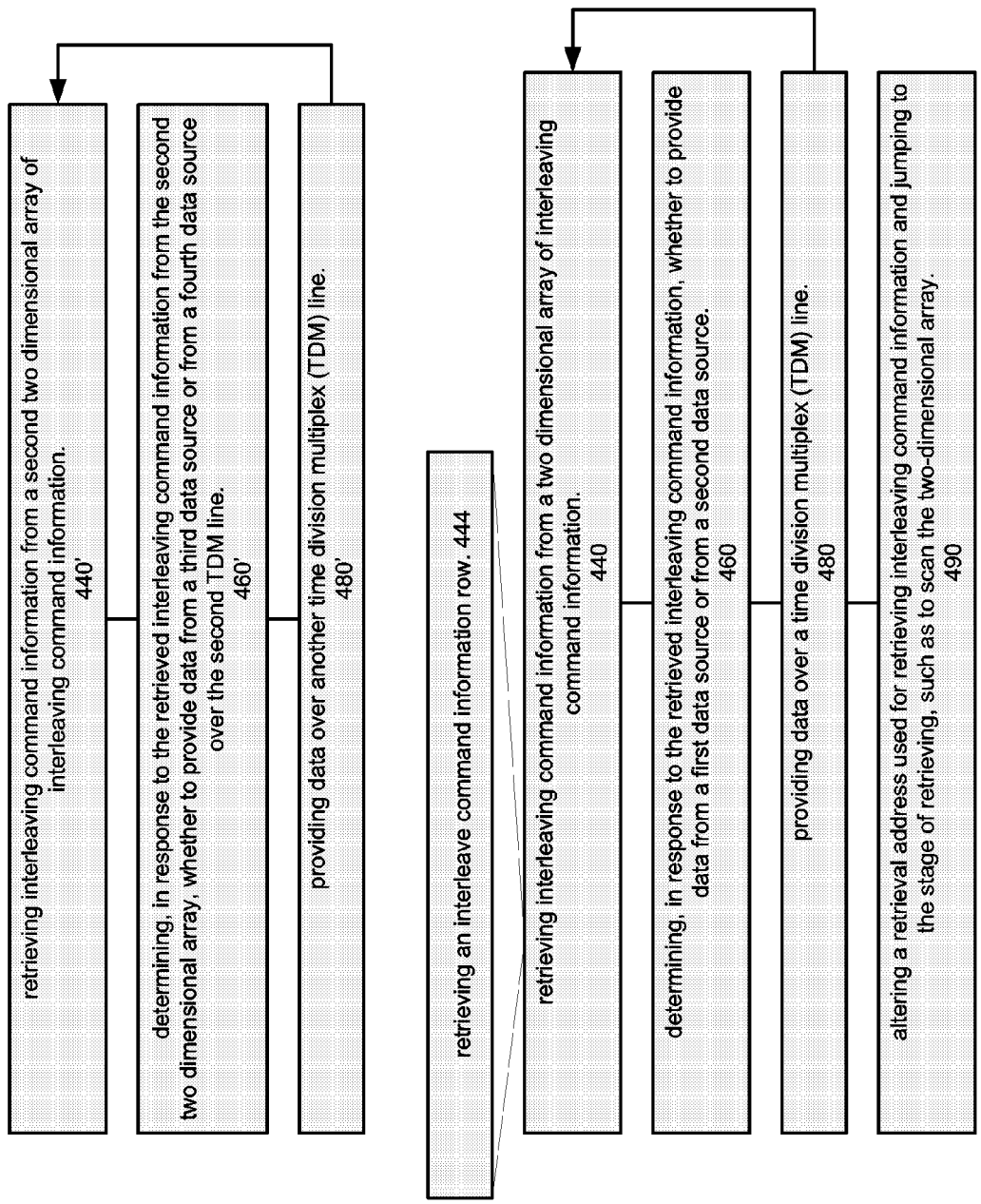
FIG. 9 illustrates a method for transmitting data according to an embodiment of the invention.

FIG. 9 illustrates method 400 for transmitting data, according to an embodiment of the invention.

Method 400 starts by stage 440 of retrieving interleaving command information from a two dimensional array of interleaving command information. The two dimensional array includes multiple interleaving command information rows. Each row includes interleaving commands associated with multiple TDM time slots.

Conveniently, stage 440 includes stage 444 of retrieving an interleave command information row.

Conveniently, stage 440 includes accessing a memory unit by a retrieval address that includes a row selection portion and an inter-row offset portion.

Stage 440 is followed by stage 460 of determining, in response to the retrieved interleaving command information, whether to provide data from a first data source or from a second data source.

Conveniently, stage 460 of determining includes comparing between the inter-row offset portion and a retrieved interleave command information row.

Conveniently, stage 460 of determining includes performing a bit wise comparison between the inter-row offset portion and a retrieved interleave command information row to provide intermediate comparison results and applying a logical OR operation on the intermediate comparison results to provide a comparison result.

Conveniently, stage 460 includes determining whether to provide data from a first data source or from a second data source in response to the value and to the location of interleave command bits within a retrieved interleave command information row.

Conveniently, interleaving command information includes a bit per TDM channel. This bit allows a selection between two different data sources. It is noted that $2^R$ bits can be used for selecting between R different data sources.

Stage 460 is followed by stage 480 of providing data over a time division multiplex (TDM) line.

Stage 460 can also be followed by stage 490 of altering a retrieval address used for retrieving interleaving command information and jumping to the stage of retrieving, such as to scan the two-dimensional array.

Conveniently, method 400 includes instructing an interface coupled to a non-selected data source to enter a high impedance state.

According to an embodiment of the invention multiple two-dimensional array of interleaving command information are provided. Each two-dimensional array can be used for selecting between two (or more) data sources. Each two-dimensional array can control the transmission over a single TDM line.

Conveniently, method 400 can include the following additional optional stages: stage 440' of retrieving interleaving command information from a second two dimensional array of interleaving command information; stage 460' of determining, in response to the retrieved interleaving command information from the second two dimensional array, whether to provide data from a third data source or from a fourth data source over the second TDM line; and stage 480' of providing data over another time division multiplex (TDM) line.

An exemplary implementation of method 400 is illustrated in FIG. 4. It is noted that other circuits can implement method 400 without departing from the spirit of the invention.

Figure 10:
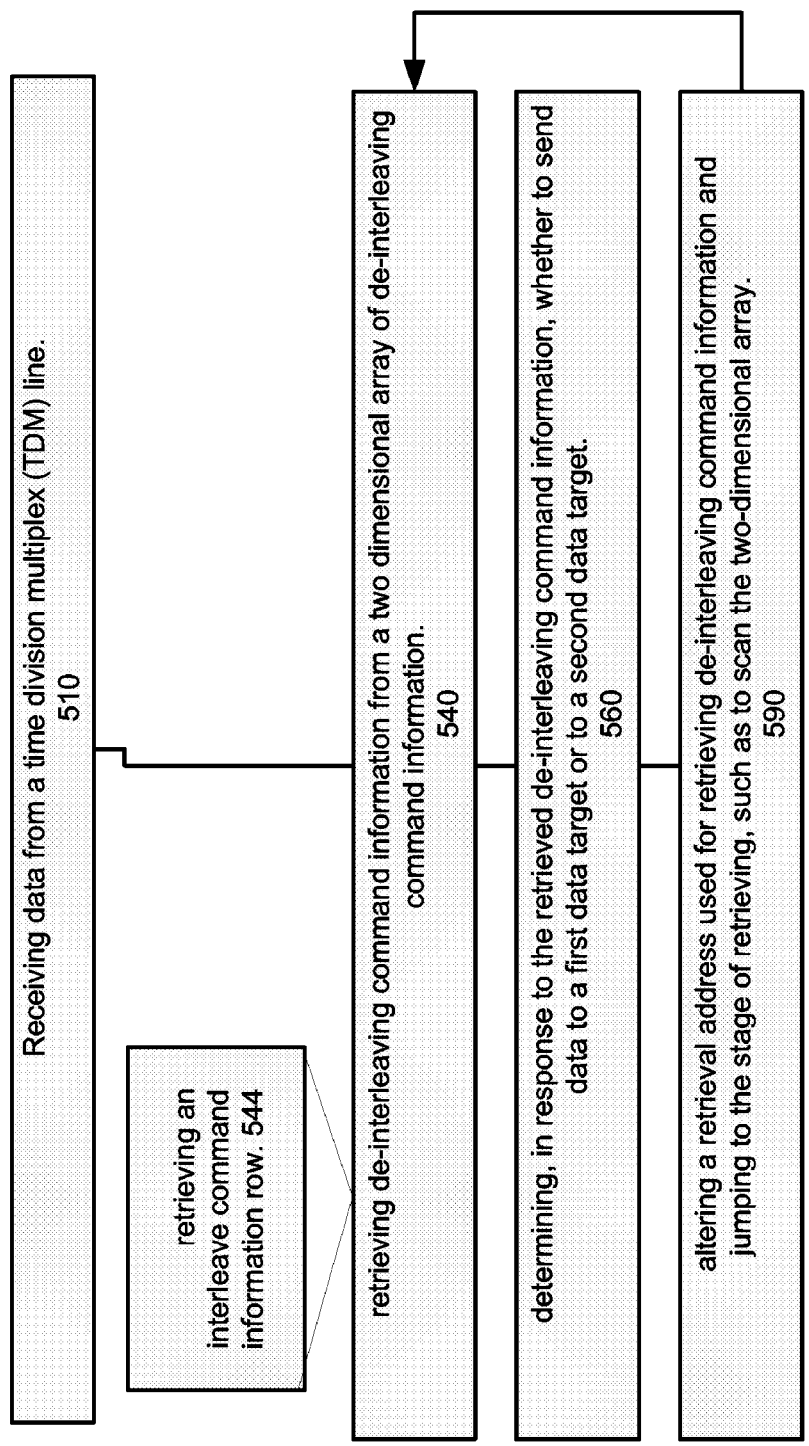
FIG. 10 illustrates a method for de-interleaving data, according to an embodiment of the invention.

FIG. 10 illustrates method 500 for de-interleaving data, according to an embodiment of the invention.

Method 500 starts by stage 520 of receiving data over a TDM line.

Stage 520 is followed by stage 540 of retrieving de-de-interleaving command information from a two dimensional array of de-interleaving command information. The two dimensional array includes multiple de-interleaving command information rows. Each row includes de-interleaving commands associated with multiple TDM time slots.

Conveniently, stage 540 includes stage 544 of retrieving an de-interleave command information row.

Conveniently, stage 540 includes accessing a memory unit by a retrieval address that includes a row selection portion and an inter-row offset portion.

Stage 540 is followed by stage 560 of determining, in response to the retrieved de-interleaving command information, whether to provide data to a first data target or to a second data target.

Conveniently, stage 560 of determining includes comparing between the inter-row offset portion and a retrieved de-interleave command information row.

Conveniently, stage 560 of determining includes performing a bit wise comparison between the inter-row offset portion and a retrieved de-interleave command information row to provide intermediate comparison results and applying a logical OR operation on the intermediate comparison results to provide a comparison result.

Conveniently, stage 560 includes determining whether to provide data to a first data source or to a second data source in response to the value and to the location of de-interleave command bits within a retrieved de-interleave command information row.

Conveniently, de-interleaving command information includes a bit per TDM channel. This bit allows a selection between two different data outputs. It is noted that $2^R$ bits can be used for selecting between R different data outputs.

Stage 560 can also be followed by stage 590 of altering a retrieval address used for retrieving de-interleaving command information and jumping to the stage of retrieving, such as to scan the two-dimensional array.

According to an embodiment of the invention multiple two-dimensional array of de-interleaving command information are provided. Each two-dimensional array can be used for selecting between two (or more) data targets. Each two-dimensional array can control the reception of data from a single TDM line.

FIG. 11 illustrates a flow chart of method 600, according to an embodiment of the invention.

Method 600 starts by stage 610 of defining a transmission schedule of a TDM data frame that includes multiple TDM time slots allocated for transmitting data over a TDM line.

Stage 610 is followed by stage 615 of providing a transmission clock signal having a transmission clock frequency to the TDM line, providing a first clock signal having a first clock frequency to data sources that belong to a first group of data sources and providing a second clock signal having a second clock frequency to data sources that belong to a second group of data sources; the first clock frequency and the second clock frequency are higher than the transmission clock frequency.

Stage 615 is followed by stage 620 and 630.

Stage 620 includes pre-fetching to a first intermediate storage a data segment from a data source out of the first group of data sources in response to a fullness level of the first intermediate storage unit and to the transmission schedule.

Stage 630 includes pre-fetching to a second intermediate storage a data segment from a data source out of the second group of data sources in response to a fullness level of the first intermediate storage unit and to the transmission schedule.

Stage 620 and 630 is followed stage 640 of providing in response to the transmission schedule, a stabilized data segment from the first or the second intermediate storage units to a transmission storage unit.

Conveniently, the stage 640 of providing includes sampling the data segment at the transmission clock frequency.

Stage 640 is followed by stage 650 of transmitting the data segment from the transmission storage unit over the TDM line.

An exemplary implementation of method 600 is illustrated in FIG. 6. It is noted that the other circuits can implement method 600 without departing from the spirit of the invention.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for transmitting data, the method comprises:
transmitting a group of time division multiplexed data frames over a group of TDM lines;
scanning at least a first memory unit to retrieve data segments associated with multiple TDM channels, in response to a definition of multiple TDM time frames, each TDM time frame comprises multiple time slots;
sending the retrieved data segments to an array of line shifters; and
multiplexing data segments provided from the array of line shifters, in response to the definition, such as to provide in a parallel manner multiple data segments to multiple TDM lines.

2. The method according to claim 1 further comprising defining a number of TDM lines out of a plurality of TDM lines that are to be activated to form the group of TDM lines.

3. The method according to claim 2 wherein a scanning interval being scanned during the scanning is responsive to the number of TDM lines.

4. The method according to claim 2 further comprising defining a number of line shifters that form the array of line shifters in response to the number of TDM lines.

5. The method according to claim 4 wherein the array of line shifters are selected from a group of multiple line shifters wherein the array of line shifters comprises n*K line shifters, wherein K is a number of TDM lines, n is a positive integer, and wherein n*K is not bigger than G while (n+1)*K is bigger than G.

6. The method according t: claim 1 further comprising providing a first clock signal to the array of line shifters and to multiplexers that perform the multiplexing while providing at least one other clock signal to multiple. TDM transmitters that perform the transmitting.

7. The method according to claim 1 wherein the multiplexing comprises scanning selected inputs of multiple multiplexers.

8. The method according to claim 1 further comprising: repeating the scanning in response to an emptiness level of the array of line shifters.

9. The method according to claim 1 wherein the scanning at least a first memory unit and a scanning of selected inputs of multiple multiplexers comprise utilizing counters that are synchronized to each other.

10. The method according to claim 1 further comprising altering a definition of the multiple TDM time frames.

11. A device comprising:
multiple time division multiplex transmitters to transmit a group of data frames over a group of TDM lines;
a controller to define or receive a definition of multiple TDM time frames, whereas each TDM time frame comprises multiple time slots;
a data retriever to scan at least a first memory unit to retrieve data segments associated with multiple TDM channels, in response to the definition and to send the retrieved data segments to an array of line shifters; and
multiple multiplexers to multiplex data segments provided from the array of line shifters, in response to the definition, such as to provide in a parallel manner multiple data segments to multiple TDM transmitters.

12. The device according to claim 11 wherein the controller to receive or define a number of TDM lines the form the group of TDM lines.

13. The device according to claim 12 wherein the data retriever to scan the at least first memory unit at a scanning interval that is responsive to the number of TDM lines.

14. The device according to claim 12 wherein the device to define a number of line shifters that form the array of line shifters in response to the number of TDM lines.

15. The device according to claim 14 wherein the device comprises a group of line shifters, the array of line shifters is selected from the group of line shifters; the array of line shifters comprises n*K line shifters, K is a number of TDM lines, n is a positive integer; and wherein n*K is not bigger than G while (n+1)*K is bigger than G.

16. The device according to claim 11 further comprising at least one clock signal provider to provide a first clock signal to the array of line shifters and to the multiple multiplexers and to provide at least one other clock signal to the multiple TDM transmitters.

17. The device according to claim 11 wherein the multiple multiplexers are coupled to multiple multiplexer scanners to scan selected inputs of the multiple multiplexers.

18. The device according to claim 11 wherein the device to repeat scanning the at least first memory unit in response to an emptiness level of the array of line shifters.

19. The device according to claim 11 further comprising a data retrieval counter that is synchronized to multiple multiplexer scanners.

20. The method of claim 1 wherein the definition of multiple TDM time frames is performed by defining a number of active channels to be spread over the group of TDM lines.

* * * * *